(12) United States Patent
Tanizaki et al.

(10) Patent No.: US 10,005,041 B2
(45) Date of Patent: Jun. 26, 2018

(54) POTTING MATERIAL FOR MEMBRANE MODULES AND HOLLOW FIBER MEMBRANE MODULE USING SAME

(71) Applicant: Mitsubishi Chemical Corporation, Tokyo (JP)

(72) Inventors: Yoshie Tanizaki, Toyohashi (JP);
Ayumi Tanaka, Toyohashi (JP);
Masakazu Minagawa, Toyohashi (JP);
Kana Inoue, Toyohashi (JP)

(73) Assignee: Mitsubishi Chemical Corporation, Tokyo (JP)

(*) Notice: Subject to any disclaimer, the term of this patent is extended or adjusted under 35 U.S.C. 154(b) by 0 days. days.

(21) Appl. No.: 15/315,121

(22) PCT Filed: Jun. 2, 2015

(86) PCT No.: PCT/JP2015/065911
§ 371 (c)(1),
(2) Date: Nov. 30, 2016

(87) PCT Pub. No.: WO2015/186705
PCT Pub. Date: Dec. 10, 2015

(65) Prior Publication Data
US 2017/0189860 A1      Jul. 6, 2017

(30) Foreign Application Priority Data

Jun. 4, 2014  (JP) .................................. 2014-115973
Apr. 20, 2015 (JP) .................................. 2015-085576

(51) Int. Cl.
*B01D 53/22* (2006.01)
*B01D 69/08* (2006.01)
(Continued)

(52) U.S. Cl.
CPC ............. *B01D 69/08* (2013.01); *B01D 63/00* (2013.01); *B01D 63/02* (2013.01); *B01D 69/10* (2013.01); *B01D 69/12* (2013.01)

(58) Field of Classification Search
CPC ........ B01D 69/10; B01D 63/02; B01D 63/00; B01D 69/12
See application file for complete search history.

(56) References Cited

U.S. PATENT DOCUMENTS 3,015,647 A * 1/1962 Lo .................... C07D 303/24
                                                528/109
3,390,124 A * 6/1968 Kittridge ............... C08G 59/54
                                                 528/99
(Continued)

FOREIGN PATENT DOCUMENTS

EP        1174175 A1     1/2002
JP        57-169401 U   10/1982
(Continued)

OTHER PUBLICATIONS

International Search Report issued in corresponding International application No. PCT/JP2015/065911 dated Aug. 11, 2015.
(Continued)

*Primary Examiner* — Anthony Shumate
(74) *Attorney, Agent, or Firm* — Morgan, Lewis & Bockius LLP

(57) ABSTRACT

A potting material for membrane modules which is formed of an epoxy resin composition, in which the mass change ratio of a cured product of the epoxy resin composition after being immersed in diethylene glycol methyl ethyl ether at 40° C. for one week is ±10% or less, and the mass change ratio thereof after being immersed in tetrahydrofurfuryl
(Continued)

acrylate at 40° C. for one week is ±5% or less, and a hollow fiber membrane module which uses the potting material for membrane modules.

10 Claims, 2 Drawing Sheets

(51) Int. Cl.
*B01D 69/10* (2006.01)
*B01D 69/12* (2006.01)
*B01D 63/00* (2006.01)
*B01D 63/02* (2006.01)

(56) References Cited

U.S. PATENT DOCUMENTS

| | | | | |
|---|---|---|---|---|
| 5,405,701 A * | 4/1995 | Fujibayashi | ....... | C08G 59/3218 428/418 |
| 5,543,212 A * | 8/1996 | Oosedo | ................ | B29C 70/083 428/902 |
| 6,045,898 A * | 4/2000 | Kishi | ..................... | C08G 59/18 428/292.1 |
| 6,648,945 B1 * | 11/2003 | Takeda | ............... | B01D 19/0031 95/46 |
| 2003/0064228 A1 * | 4/2003 | Oosedo | ................. | C08G 59/18 428/413 |
| 2009/0162653 A1 * | 6/2009 | Sakata | ..................... | C08J 5/042 428/367 |
| 2010/0199840 A1 | 8/2010 | Yamaoka et al. | | |
| 2011/0240064 A1 * | 10/2011 | Wales | ..................... | C09D 5/14 134/26 |
| 2011/0250626 A1 * | 10/2011 | Williams | ............... | A01N 63/02 435/18 |
| 2012/0031831 A1 | 2/2012 | Kanougi et al. | | |
| 2012/0097194 A1 * | 4/2012 | McDaniel | .............. | A01N 63/02 134/26 |
| 2015/0105503 A1 * | 4/2015 | Ooki | ...................... | C08G 73/10 524/94 |
| 2016/0326388 A1 * | 11/2016 | Petcavich | ............ | C09D 11/101 |
| 2017/0158829 A1 * | 6/2017 | Hondo | ........................ | C08J 5/04 |
| 2017/0283570 A1 * | 10/2017 | Kim | ............................ | C08J 5/24 |

FOREIGN PATENT DOCUMENTS

| | | |
|---|---|---|
| JP | 01-289884 A | 11/1989 |
| JP | 02-031821 A | 2/1990 |
| JP | 02-218714 A | 8/1990 |
| JP | 02-268815 A | 11/1990 |
| JP | 2000-342934 A | 12/2000 |
| JP | 2009-082842 A | 4/2009 |
| JP | 2010-082496 A | 4/2010 |
| JP | 2010-184228 A | 8/2010 |
| JP | 2012-131849 A | 7/2012 |
| JP | 2012-205981 A | 10/2012 |
| WO | 2010/114010 A1 | 10/2010 |

OTHER PUBLICATIONS

Office Action issued in corresponding Japanese Patent Application No. 2015-530179 dated Apr. 26, 2016.
Extended European Search Report issued in corresponding European Patent Application No. 15803673.1 dated May 4, 2017.

* cited by examiner

POTTING MATERIAL FOR MEMBRANE MODULES AND HOLLOW FIBER MEMBRANE MODULE USING SAME

TECHNICAL FIELD

The present invention relates to a potting material for membrane modules which is used for fixing a membrane in a module case of a membrane module like hollow fiber membrane module, and a hollow fiber membrane module using the potting material. This application claims priority to Japanese Patent Application Nos. 2014-115973 and 2015-085576 which have been filed in Japan on Jun. 4, 2014 and Apr. 20, 2015, respectively, and the disclosures of which are incorporated herein by reference in their entirety.

BACKGROUND ART

A hollow fiber membrane module having a hollow fiber membrane as a separation membrane is used for various applications including filtration of liquid or gas, solid/liquid separation, concentration of a substance, removal or concentration of cellular bodies, and removal of gas dissolved in liquid (that is, deaeration).

The hollow fiber membrane module is produced by encasing a hollow fiber membrane bundle in a module case, injecting a potting material to an end part of the hollow fiber membrane bundle followed by curing to form a potting part, and cutting an end part of the potting part together with the hollow fiber membrane bundle so as to open the end part of the hollow fiber membrane bundle. The injected potting material is evenly distributed either between hollow fiber membranes or between a hollow fiber membrane bundle and an inner peripheral surface of a module case, and according to curing of the potting material, the hollow fiber membrane bundle is fixed in the module case.

At the time of using a hollow fiber membrane module, the potting part is brought into contact with a liquid to be treated of a membrane treatment subject or a treatment liquid after membrane treatment. For such reasons, the potting material is required to form a potting part which exhibits excellent chemical resistance to those liquids. If the potting part exhibits poor chemical resistance, in accordance with use of a hollow fiber membrane module, a liquid to be treated of a membrane treatment subject or a treatment liquid after membrane treatment permeates the potting part to cause swelling or the potting part is dissolved out by those liquids. As a result, the potting part may peel off from a hollow fiber membrane or from an inner peripheral surface of a module case, or disintegration of the potting part occurs. Accordingly, a leak is yielded. Furthermore, when the potting part is dissolved into a treatment liquid, composition and properties of the treatment liquid are also affected.

Under the circumstances described above, a potting material capable of forming a potting part which exhibits a little change in mass between before and after immersion in a chemical liquid and has excellent chemical resistance is disclosed (Patent Literature 1 and the like)

Furthermore, a gas separation membrane module for separating organic vapor which has durability of sufficiently maintaining air tightness between an inner space and an outer surface of a hollow fiber membrane even when being used in organic vapor at high temperature and high pressure is disclosed (Patent Literature 2 and the like).

CITATION LIST

Patent Literature

Patent Literature 1: JP 2000-342934 A
Patent Literature 2: JP 2010-082496 A

SUMMARY OF THE INVENTION

Problem to be Solved by the Invention

However, as the hollow fiber membrane module is used in a broad range in recent years, it is required to have a potting material capable of forming a potting part with more excellent chemical resistance and a hollow fiber membrane module using the potting material that is unlikely to have an occurrence of a leak. For example, although a hollow fiber membrane module is used for deaeration of ink for an inkjet printer, according to broadening of a print subject accompanied with a development of print techniques and various needs in recent years, type of the ink as a treatment subject is also quite broad. Furthermore, for those applications in particular, the techniques described in Patent Literatures 1 and 2 are insufficient in terms of chemical resistance.

The invention is devised under the circumstances described above, and object of the invention is to provide a potting material for membrane modules capable of forming a potting part with excellent chemical resistance, and a hollow fiber membrane module using the potting material that is unlikely to have an occurrence of a leak.

Means for Solving Problem

The invention includes the following aspects.
[1] A potting material for membrane modules which is formed of an epoxy resin composition, in which mass change ratio of a cured product of the epoxy resin composition after being immersed in diethylene glycol methyl ethyl ether at 40° C. for one week is ±10% or less, and mass change ratio of a cured product of the epoxy resin composition after being immersed in tetrahydrofurfuryl acrylate at 40° C. for one week is ±5% or less.
[2] The potting material for membrane modules described in [1], in which storage modulus of a cured product of the potting material for membrane modules is $1.0 \times 10^6$ to $5.0 \times 10^7$ Pa at 80° C.
[3] The potting material for membrane modules described in [1] or [2], in which the epoxy resin composition contains at least an epoxy resin component (a) which has 1 or more aromatic rings and 3 or more glycidyl groups.
[4] The potting material for membrane modules described in [3], in which the epoxy resin composition contains the epoxy resin component (a), an epoxy resin component (b) having a polysulfide skeleton, and a glycidyl ether type epoxy resin component (c).
[5] The potting material for membrane modules described in [3] or [4], in which the epoxy resin composition additionally contains an aromatic polyamine curing agent (d).
[6] The potting material for membrane modules described in [5], in which the aromatic polyamine curing agent (d) is epoxy-modified aromatic polyamine.
[7] The potting material for membrane modules described in [5] or [6], in which the aromatic polyamine curing agent (d) is a compound derived from 4,4'-diaminodiphenylmethane.
[8] A hollow fiber membrane module having a hollow fiber membrane bundle which consists of plural hollow fiber membranes and a module case in which the hollow fiber membrane is encased, in which an end part of the hollow fiber membrane bundle is fixed in the module case by the potting material for membrane modules described in any one of [1] to [7].

[9] The hollow fiber membrane module described in [8], in which the hollow fiber membrane is a gas permeable composite membrane formed of a gas permeable homogeneous layer and a porous support layer to which the homogeneous layer is inserted.

[10] The hollow fiber membrane module described in [8] or [9], in which a membrane bundle restraining device for restraining the hollow fiber membrane bundle at a region fixed by the potting material for membrane modules is disposed in the module case.

Effect of the Invention

According to the invention, a potting material for membrane modules for forming a potting part with excellent chemical resistance and a hollow fiber membrane module using the potting material that is unlikely to have an occurrence of a leak can be provided.

MODE(S) FOR CARRYING OUT THE INVENTION

Figure 1:
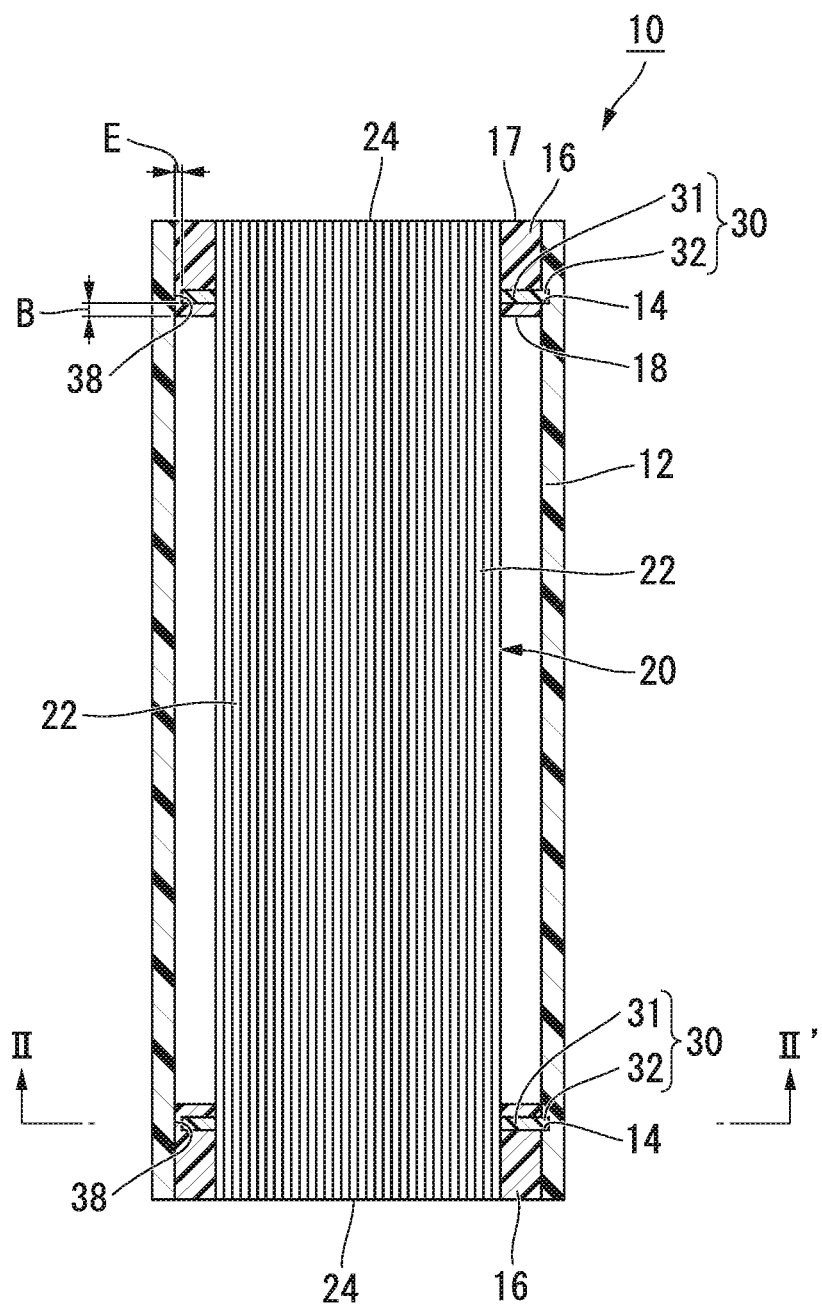
FIG. 1 is a longitudinal cross-sectional view illustrating one example of a hollow fiber membrane module of the invention.

Hereinbelow, the invention is described in detail.
[Potting Material for Membrane Modules]

The potting material for membrane modules (hereinbelow, sometimes simply described as "potting material") of the invention is formed of an epoxy resin composition, in which mass change ratio of a cured product of the epoxy resin composition after being immersed in diethylene glycol methyl ethyl ether (hereinbelow, also described as a "first chemical liquid") at 40° C. for one week is ±10% or less, and mass change ratio of a cured product of the epoxy resin composition after being immersed in tetrahydrofurfuryl acrylate (hereinbelow, also described as a "second chemical liquid") at 40° C. for one week is ±5% or less. A potting material in which any of the mass change ratio of a cured product after being immersed in the first chemical liquid and the mass change ratio of a cured product after being immersed in the second chemical liquid at the aforementioned conditions is within the above range has excellent chemical resistance. Furthermore, the first chemical liquid is broadly used as a medium for ink for an inkjet printer or the like and the second chemical liquid is broadly used as a monomer for ink for a UV curable type inkjet printer or the like. For such reasons, a membrane module constructed by using the potting material of the invention, in which each of the above mass ratios is within the above range, is unlikely to have a leak when the module is used as a deaeration module for ink used for an inkjet printer.

Examples of a separation membrane provided in the membrane module include a hollow fiber membrane, a plane membrane, a tubular membrane, and a spiral membrane.

From the viewpoint of a deaeration performance, a hollow fiber membrane is preferable, and the potting material of the invention is preferably used as a hollow fiber potting material for membrane modules.

As described in the present specification, the mass change ratio is defined by the following formula.

Mass change ratio (%)=($Wa$ $Wb$)×100/$Wb$ $Wa$: Mass of cured product after immersion in chemical liquid $Wb$: Mass of cured product before immersion in chemical liquid For the immersion test using the first chemical liquid and the second chemical liquid, a test piece prepared as follows is used. First, each component for forming an epoxy resin composition is mixed and deaerated, and the resultant is injected to a space between a pair of glass plates in which a spacer with thickness of 2 mm is disposed in a liquid-tight manner. Accordingly, a non-cured resin plate is obtained. Subsequently, the non-cured resin plate is allowed to stand overnight at room temperature followed by heating and curing for 6 hours at 60° C. to obtain a plate-like cured product. The cured product is cut to a size of 50 mm×10 mm×2 mm, and the resultant is used as a test piece. Then, mass before and after the immersion is measured.

Furthermore, with regard to the immersion test for obtaining the mass change ratio, the test is carried out for 3 samples for each of the chemical liquids, and the average value of the 3 samples is used as mass change ratio (%).

The mass change ratio of more than +10% after immersion in the first chemical liquid for 1 week and the mass change ratio of more than +5% after immersion in the second chemical liquid for 1 week mean that significant swelling is caused by permeation of each chemical liquid. According to a membrane module like a hollow fiber membrane module which is provided with a potting part formed of such potting material, the potting part may peeled off from a separation membrane or an inner side of a module case, or disintegrate according to use of the membrane module, and thus a leak may easily occur. Furthermore, there can be a case in which the module case itself is broken. On the other hand, mass change ratio of less than −10% after immersion in the first chemical liquid for 1 week and the mass change ratio of less than −5% after immersion in the second chemical liquid for 1 week mean that there is a significant dissolution into each chemical liquid. According to a membrane module which is provided with a potting part formed of such potting material, the potting part may peeled off from a separation membrane or an inner side of a module case, or disintegrate according to use of the membrane module, and thus a leak may easily occur. Furthermore, according to dissolution into a treatment liquid after membrane treatment, there can be a case in which composition, properties, or the like of a treatment liquid are affected.

From the viewpoint of having more excellent chemical resistance, the mass change ratio of a cured product of the epoxy resin composition after being immersed in the first chemical liquid at the aforementioned conditions is preferably ±6% or less. Furthermore, the mass change ratio of a cured product of the epoxy resin composition after being immersed in the second chemical liquid at the aforementioned conditions is preferably ±1% or less.

From the viewpoint of the chemical resistance, the hardness change ratio of a cured product of the epoxy resin composition after being immersed in the first chemical liquid as described above is preferably ±10% or less. Furthermore, the hardness change ratio after being immersed in the second chemical liquid is preferably ±5% or less.

As described in the present specification, the hardness change ratio is defined by the following formula. Meanwhile, D hardness indicates a value measured by using a D hardness tester.

Hardness change ratio (%)=(Ha Hb)×100/Hb

Ha: D hardness of cured product after immersion in chemical liquid

D hardness of cured product before immersion in chemical liquid

The test piece which is used for an immersion test to obtain hardness change ratio can be prepared in the same manner as the test piece which is used for an immersion test to obtain mass change ratio. Furthermore, with regard to the immersion test for obtaining the hardness change ratio, the test is carried out for 3 samples for each of the chemical liquids, and the average value of the 3 samples is used as hardness change ratio (%).

Examples of the potting material for forming the above cured product include an epoxy resin composition which contains, as a main component, at least an epoxy resin component (a) having 1 or more aromatic rings and 3 or more glycidyl groups in one molecule.

As the epoxy resin component (a) has 3 or more glycidyl groups, a cured product of the epoxy resin composition containing the epoxy resin component (a) has high cross-linking density. Furthermore, as the epoxy resin component (a) has 1 or more aromatic rings, a cured product of the epoxy resin composition containing the epoxy resin component (a) has a rigid structure of which stereo configuration has a low degree of freedom. Swelling of a cured product is caused by permeation of a chemical liquid into a cured product. It is believed that, for such reasons, the potting material which can form a cured product with high cross-linking density and a rigid structure with a low degree of freedom is not likely to allow permeation of a chemical liquid and thus has excellent chemical resistance.

Examples of the epoxy resin component (a) include triglycidyl paraaminophenol and triphenyl glycidyl ether methane which have 3 glycidyl groups in one molecule, and tetraphenyl glycidyl ether ethane, tetraglycidyl diaminodiphenylmethane and tetraglycidyl metaxylenediamine which have 4 glycidyl groups in one molecule.

It is possible to use 1 or more types of the epoxy resin component (a).

Examples of a commercially available product of the epoxy resin component (a) include "jER630", which is triglycidyl paraaminophenol manufactured by Mitsubishi Chemical Corporation and "jER604" which contains tetraglycidyl diaminodiphenylmethane as a main component and manufactured by Mitsubishi Chemical Corporation.

The epoxy resin composition preferably has, as a main component, an epoxy resin component (b) having a polysulfide skeleton, and also preferably contains a glycidyl ether type epoxy resin component (c) in addition to the epoxy resin component (a) described above.

It is possible that at least one type of each of the epoxy resin component (b) and the epoxy resin component (c) is used.

The epoxy resin component (b) has poor compatibility with the first chemical liquid and the second chemical liquid that are described above. For such reasons, a cured product of an epoxy resin in which, as a main component, the epoxy resin component (a) is used in combination with the epoxy resin component (b) is more unlikely to have an occurrence of swelling caused by a chemical liquid, and thus has excellent chemical resistance.

Examples of the epoxy resin component (b) include a polysulfide-modified epoxy resin that is represented by the following chemical formula.

[Chem. 1]

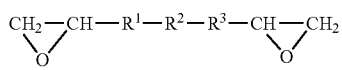

In the above formula, each of $R^1$ and $R^3$ indicates an organic group containing a bisphenol skeleton, and $R^2$ indicates a polysulfide skeleton represented by $-(C_2H_4OCH_2OC_2H_4-S_m)_n-$ (m of from 1 to 3 indicates average content of S in the polysulfide skeleton, and n of from 1 to 50 indicates average content of the polysulfide skeleton in one molecule).

Examples of the organic group containing a bisphenol skeleton include a bisphenol A type epoxy resin, a halogenated bisphenol A type epoxy resin, a bisphenol F type epoxy resin, a halogenated bisphenol F type epoxy resin, and a divalent organic group including a molecular structure which is the same as or similar to them.

m is 1 to 3 and is preferably 1.5 to 2.5.

n is 1 to 50 and is preferably 2 to 30. As n is within the above range, the effect of using the epoxy resin component (b) as a main component is obtained at sufficient level and viscosity of the epoxy resin component (b) is appropriate, and thus the resin can be easily used.

Examples of a commercially available product of the epoxy resin component (b) include "FLEP 10", "FLEP 50", "FLEP 60", and "FLEP 80" which are polysulfide-modified epoxy resins manufactured by Toray Fine Chemicals Co., Ltd.

Examples of the epoxy resin component (c) include a bisphenol A type epoxy resin, a bisphenol F type epoxy resin, and a bisphenol S type epoxy resin. By using the epoxy resin component (c), viscosity of the epoxy resin composition is within an appropriate range.

Examples of a commercially available product of the epoxy resin component (c) include "jER828" and "jER834" which are bisphenol A type epoxy resins manufactured by Mitsubishi Chemical Corporation.

The epoxy resin composition contains, in addition to the main component, a curing agent (d).

Examples of the curing agent include aliphatic polyamine, alicyclic polyamine, aromatic polyamine, polyamide polyamine, polyamide, dicyandiamide, acid anhydride, tertiary amine, imidazole compounds and $BF_3$ complex, and one or more type can be used. Among them, from the viewpoint of easily obtaining a cured product having excellent chemical resistance, a curing agent containing an aromatic polyamine is preferable. Among them, from the viewpoint of the reactivity and handling property, a modified aromatic polyamine is preferable, and modified 4,4'-diaminodiphenylmethane is more preferable. Furthermore, from the viewpoint of the reactivity and handling property, the modified aromatic polyamine and modified 4,4'-diaminodiphenylmethane are preferably epoxy-modified or Mannich-modified and more preferably epoxy-modified. Furthermore, from the viewpoint of the handling property, it is preferably a liquid at room temperature (25° C.), and an agent which is in liquid phase at room temperature or to use in the form of dissolving it in a suitable solvent may be used. Since the aromatic polyamine curing agent has an aromatic ring in the molecular chain, it has a rigid structure with a low degree of freedom of the stereo configuration due to a reaction with a main component. For such reasons, the epoxy resin composition containing aromatic polyamine as a curing agent is not likely to allow permeation of a chemical liquid, and thus it can form a cured product with excellent chemical resistance. Furthermore, as the aromatic polyamine has weaker basicity than, for example, aliphatic polyamine, and it is susceptible to the steric hindrance effects of an aromatic ring. Consequently, the epoxy resin composition containing an aromatic polyamine has no rapid curing, heat generation, or the like. As such, it is easy to control the curing rate.

When the main component contained in the epoxy resin composition is 100% by mass, content of the epoxy resin component (a) in 100% by mass of the main component is preferably 20% by mass or more, and more preferably 40% by mass or more. As the content of the epoxy resin component (a) is the same or more than the above lower limit, chemical resistance of a cured product is more excellent.

As described above, the main component preferably contains the epoxy resin component (a), the epoxy resin component (b), and the epoxy resin component (c). In this case, in 100% by mass of the main component, content of the epoxy resin component (a) is preferably 20 to 60% by mass, content of the epoxy resin component (b) is preferably 10 to 40% by mass, and content of the epoxy resin component (c) is preferably 20 to 50% by mass. More preferably, in 100% by mass of the main component, content of the epoxy resin component (a) is preferably 30 to 50% by mass, content of the epoxy resin component (b) is preferably 15 to 30% by mass, and content of the epoxy resin component (c) is preferably 30 to 50% by mass.

Content of the curing agent in the epoxy resin composition is generally a stoichiometric amount or an amount slightly higher than the stoichiometric amount relative to the main component. For example, the content of the curing agent in the epoxy resin composition is, relative to the entire epoxy resin composition, preferably adjusted within a range of 10 to 70% by mass, more preferably adjusted within a range of 20 to 60% by mass, and even more preferably adjusted within a range of 30 to 55% by mass. Furthermore, use amount of the curing agent is, relative to 100 parts by mass of the main component, preferably adjusted within a range of 40 to 100 parts by mass, and more preferably adjusted within a range of 50 to 90 parts by mass.

The epoxy resin composition may further contain a curing promoter (for example, alcohol and phenol), and in this case, it is preferable to use the curing agent in a small amount.

Conditions for curing the potting material formed of an epoxy resin composition can be suitably determined. However, from the viewpoint of easily obtaining a cured product with high cross linking density and excellent chemical resistance, it is preferable to perform the curing under heating. The curing temperature and curing time can be also suitably determined. However, conditions including heating at 60 to 70° C. for 180 to 400 minutes are preferable.

The storage modulus at 80° C. of a cured product of the potting material is preferably $1.0 \times 10^6$ to $5.0 \times 10^7$ Pa and more preferably $5.0 \times 10^6$ to $1.5 \times 10^7$ Pa from the viewpoint of the processability. In the production of a hollow fiber membrane module, an end part of a hollow fiber membrane bundle which is fixed in a module case by a cured product of the potting material is heated together with a cured product of the potting material followed by cutting to open the end part of the hollow fiber membrane bundle. At that time, if the storage modulus is the same or less than the upper limit of the above range, the cured product has suitable hardness so that brittle breakage is suppressed at the time of the cutting. Further, a load at the time of the cutting is also suppressed. Consequently, if the storage modulus is the same or less than the upper limit of the above range, it is difficult to have a loss on a cut surface at the time of the cutting. Meanwhile, if the storage modulus is the same or more than the lower limit of the above range, deformation of a cured product in accordance with progress of a blade at the time of the cutting is small, so that the cutting can be performed while maintaining the shape of a cured product. Consequently, peeling of a cured product of the potting material from a module case is suppressed.

As the epoxy resin component (a), when only an epoxy resin component having 1 or more aromatic rings and 3 or more glycidyl groups in one molecule is used, it is easy to obtain a potting material of which cured product has storage modulus within the above range. The cutting may be performed under heating conditions using a heater or the like.

Meanwhile, measurement of the storage modulus is performed as described below.

A test piece with a size of 50 mm×10 mm and a thickness of 2 mm, which is formed of a cured product of the potting material, is prepared. By using the test piece, measurement is carried out with frequency of 1 Hz at heating condition of 80° C., and the value obtained after 10 minutes from the start of heating is used as storage modulus. Measurement conditions include test length of 35 mm and deformation of 0.05% with distortion mode.

The potting material described above is composed of an epoxy resin composition, and any of the mass change ratio of a cured product of the epoxy resin composition after being immersed in the first chemical liquid and the mass change ratio of a cured product after being immersed in the second chemical liquid in the aforementioned conditions is small, and the chemical resistance is excellent. The potting material can be realized by an epoxy resin composition containing at least an epoxy resin component (a) which has 1 or more aromatic rings and 3 or more glycidyl groups in one molecule as a main component. Preferably, the potting material can be achieved by a composition containing an epoxy resin which contains the epoxy resin component (a), the epoxy resin component (b) having a polysulfide skeleton, and the glycidyl ether type epoxy resin component (c) as a main component, and the aromatic polyamine curing agent (d).

Such an epoxy resin composition is also preferable in that it has low content of metal which is impurities derived from a production process or the like. In a membrane module like a hollow fiber membrane module, when the potting part with high metal content is in contact with a liquid to be treated of a membrane treatment subject or a treatment liquid after membrane treatment, there is a possibility that the metal is dissolved out. Content of the metal in the epoxy resin composition is preferably 300 ppm or less, more preferably 100 ppm or less, and even more preferably 50 ppm or less in total amount. Examples of the metal element include alkali metals like Na and K, the alkali earth metals like Mg and Ca, the transition metals like Ti, Cr, Mn, Fe, Ni, Cu and Zn, and Al, Sn and Pb.

[Hollow Fiber Membrane Module]

Hereinbelow, descriptions are given for the hollow fiber membrane module of the invention which is obtained by using the potting material described above.

Figure 2:
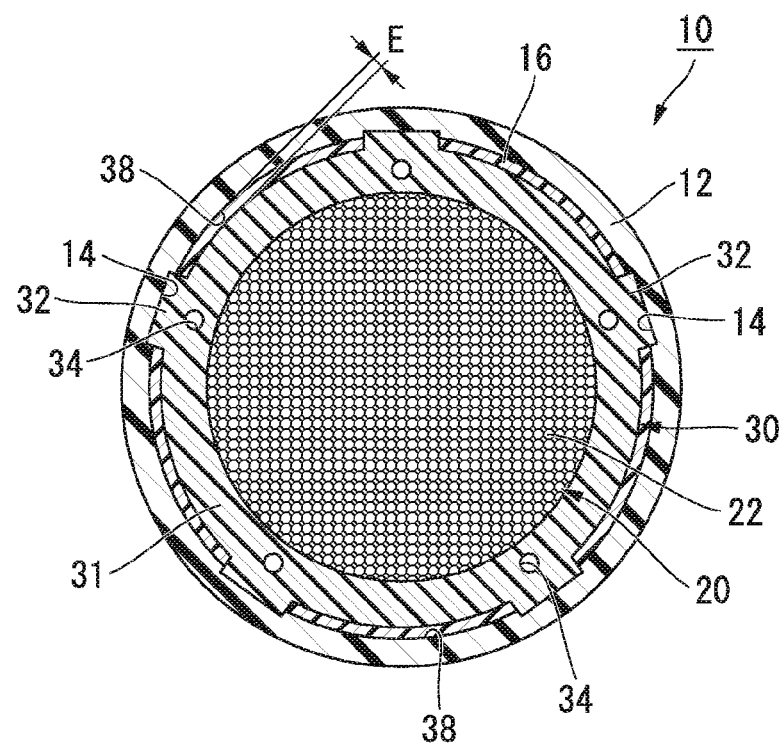
FIG. 2 is a cross-sectional view of FIG. 1 along the line of II-II'.
Figure 3:
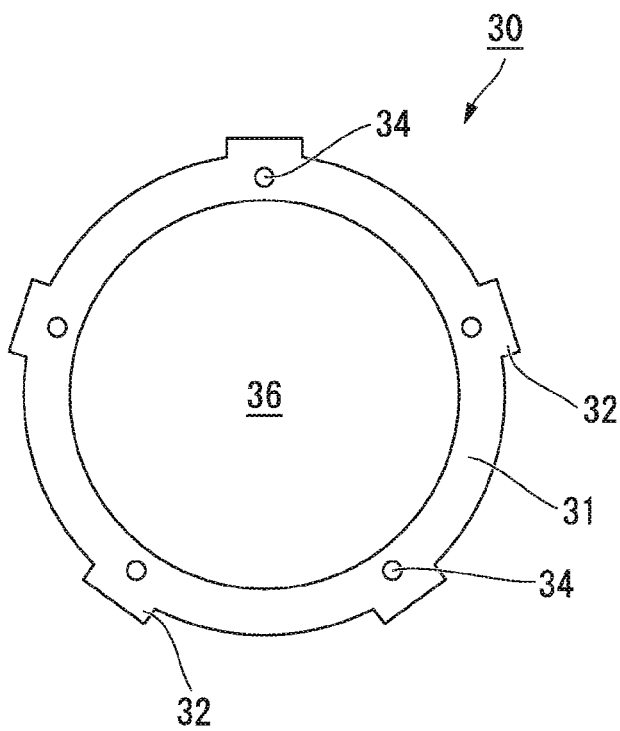
FIG. 3 is a top view illustrating one example of a membrane bundle restraining device that is provided in the hollow fiber membrane module of the invention.

FIG. 1 is a longitudinal cross-sectional view of a hollow fiber membrane module as an example of the invention, and FIG. 2 is a cross-sectional view of FIG. 1 along the line of II-II'. FIG. 3 is a top view illustrating one example of a membrane bundle restraining device which is provided in the hollow fiber membrane module of FIG. 1.

In a hollow fiber membrane module 10 of the example illustrated in drawings, a hollow fiber membrane bundle 20 in which plural hollow fiber membranes 22 are bound and a module case 12 with cylinder shape in which the hollow fiber membrane bundle 20 is encased are included, and while being maintained in an open state of an end part 24 of the hollow fiber membrane bundle 20, the hollow fiber membrane bundle 20 is fixed in the module case 12 by the potting material described above. In the drawings, symbol 16 indicates a potting part in which the potting material is cured.

According to the hollow fiber membrane module 10 of this example, a ring-shaped membrane bundle restraining device 30, which restrains the hollow fiber membrane bundle 20 (that is, the hollow fiber membrane bundle of the potting part 16) at the part fixed by the potting material is disposed in the module case 12.

(Membrane Bundle Restraining Device)

As illustrated in FIG. 3, the membrane bundle restraining device 30 of this example includes a frame-shaped ring part 31 having a circular opening part 36 to which the hollow fiber membrane bundle 20 is inserted, and plural protrusion parts 32 that are formed on an outer periphery thereof. In the ring part 31, plural penetrating holes 34 that are formed in a penetration manner in a thickness direction are formed.

In this example, as illustrated in FIG. 1, the membrane bundle restraining device 30 is disposed in each of the potting part 16 at both ends of the hollow fiber membrane bundle 20, that is, one device for each potting part 16. Each membrane bundle restraining device 30 is disposed such that, with regard to the inner side of the potting part 16, that is, with regard to one end surface 17 and the other end surface 18 of the potting part 16, the inner periphery of the potting part 16 is in contact with an outer periphery of the hollow fiber membrane bundle 20 and the outer periphery of the potting part 16 is in contact with an inner peripheral surface of the module case. On the inner peripheral surface of the module case 12, a groove part 14 is formed, and by inserting the protrusion part 32 of the membrane bundle restraining device 30 to the groove part 14, the membrane bundle restraining device 30 is fixed.

By disposing the membrane bundle restraining device 30 as illustrated, the hollow fiber membrane 22 for forming the hollow fiber membrane bundle 20 is encased in the module case 12 without being loosened, distorted, or bent, and then the hollow fiber membrane 22 is fixed while maintaining a separation state from an inner peripheral surface of the module case 12.

Herein, if the membrane bundle restraining device 30 is not disposed, the hollow fiber membrane 22 may be loosened, distorted, or bent so that it may easily contact an inner peripheral surface of the module case 12 in the vicinity of the potting part 16 or the like. In such a contact area, the injected potting material creeps up along the hollow fiber membrane 22, and thus the hollow fiber membrane 22 adhered on an inner peripheral surface of the module case 12. The hollow fiber membrane such a "resin creeping-up part" may be broken during long-term use in some cases. Such breakage leads to a leak.

On the other hand, when the membrane bundle restraining device 30 is disposed as the example illustrated in drawings, and the hollow fiber membrane bundle 20 is encased such that it is separated from an inner peripheral surface of the module case 12, forming of the "resin creeping-up part" is suppressed. Accordingly, the aforementioned leak caused by forming of the "resin creeping-up part" is also suppressed.

Namely, in the hollow fiber membrane module 10 of this example, the aforementioned epoxy resin composition which exhibits excellent chemical resistance and hardly allows an occurrence of a leak at the time of being prepared as a cured product is used as a potting material, and also the membrane bundle restraining device 30 is included. For such reasons, from the viewpoint of those two aspects, an occurrence of a leak is further suppressed.

The distance B from the end surface 18 facing the inner surface of the module case 12 of the potting part 16 as a position for disposing the membrane bundle restraining device 30 to the end surface 17 can be determined based on the thickness of the potting part 16, the outer diameter of the hollow fiber membrane bundle 20, conditions for injecting the potting material, or the like. The distance B is, for example, preferably set to 2 to 10 mm, and more preferably set to 2 to 5 mm. When the thickness of the potting part 16 is even, the position for disposing the potting part 16 is preferably close to the end surface 18. However, if it is a position of less than 2 mm, based on the problem associated with process precision, there is a possibility that the membrane bundle restraining device 30 cannot be embedded in the potting part 16. On the other hand, if it is a position of more than 10 mm, there is a possibility that the hollow fiber membrane bundle 20 is spread in the vicinity of the end surface 18 so as to be in contact with the module case 12.

As illustrated in FIG. 2, it is preferred for the membrane bundle restraining device 30 to have a shape which allows, when disposed in the module case 12, forming of an interval 38 with distance of E between an inner peripheral surface of the module case 12 and the outer periphery of the membrane bundle restraining device 30. The interval 38 is a passage for filling the potting material at both side of the membrane bundle restraining device 30. The distance E can be determined in consideration of a type of the potting material, a shape, a size or the like of the module case 12 or the membrane bundle restraining device 30. For example, when the inner diameter of the module case 12 is 60 mmφ, it is preferable to have the distance E of less than 1 mm. More preferably, the distance E is 0.4 to 0.8 mm. It is preferable that the distance E is as small as possible. However, if the distance E is excessively small, it is difficult to fill the potting material evenly. On the other hand, if the distance E is excessively large, the effect of the membrane bundle restraining device 30 is insufficient. By forming an interval with distance E between the inner peripheral surface of the module case 12 and the outer periphery of the membrane bundle restraining device 30, not only the resin can evenly pass through and get filled during the time of filling the potting material but also the effect of forming the membrane bundle restraining device 30 can be obtained at sufficient level. However, in the case of a large size hollow fiber membrane module in which the inner diameter of the module case 12 is 100 mmφ or more, the distance E can be set to 1 mm or more depending on the inner diameter of the module case 12.

Meanwhile, in the present embodiment, the passage through which the potting material for forming the potting part passes the membrane bundle restraining device is the interval 38 and the penetrating hole 34 that are described above.

As the membrane bundle restraining device 30 is embedded in the potting part 16 so that it is not in direct contact with a liquid to be treated of a membrane treatment subject or a treatment liquid after membrane treatment, the membrane bundle restraining device 30 is formed of a resin for universal use. Examples of the resin include polyolefin, ABS, and vinyl chloride.

As for the membrane bundle restraining device 30, for example, those described in JP 2010-184228 A or the like can be used.

(Hollow Fiber Membrane)

Constitution of the hollow fiber membrane 22 can be selected depending on a membrane treatment subject. However, a gas permeable composite membrane having three-layer structure which consists of a homogeneous layer with gas permeability and a porous support layer for inserting the homogenous layer is preferred in that it has excellent strength. Furthermore, for deaeration use like ink for an inkjet printer, it is preferred in that, as the dissolved gas can be deaerated with suppression of a leak of a liquid, it has an excellent deaeration performance.

Examples of a material which can be used for the homogenous layer include a silicone rubber-based resin such as polydimethylsiloxane or copolymer of silicone and polycarbonate; a polyolefin-based resin such as a copolymer of ethylene and α-olefin, poly 4-methylpentene-1, low density polyethylene, high density polyethylene, linear low density polyethylene, linear ultralow density polyethylene, polypropylene, an ionomer resin, a copolymer of ethylene-vinyl acetate, a copolymer of ethylene•(meth)acrylic acid, a copolymer of ethylene-methyl (meth)acrylic acid, or modified polyolefin (for example, a reaction product of a homopolymer or a copolymer of olefin with unsaturated carboxylic acid like maleic acid and fumaric acid, acid anhydride, ester, or metal salt); a fluorine-containing resin such as polyvinylidene fluoride or polytetrafluoroethylene; a cellulose-based resin such as ethyl cellulose; polyphenylene oxide; poly 4-vinylpyridine; and a urethane resin. A single type of those resins may be used alone or a blend of two or more types of them may be used. Furthermore, a copolymer of those resins can be also used.

Examples of a material of the porous support layer include a silicone rubber-based resin such as polydimethylsiloxane or copolymer of silicone and polycarbonate; a polyolefin-based resin such as poly 4-methylpentene-1, poly 3-methylpentene-1, low density polyethylene, or polypropylene; a fluorine-containing resin such as polyvinylidene fluoride or polytetrafluoroethylene; a cellulose-based resin such as ethyl cellulose; polyphenylene oxide; poly 4-vinylpyridine; a urethane resin; polystyrene; polyether ether ketone; and polyether ketone. A single type of those resins may be used alone or a blend of two or more types of them may be used. Furthermore, a copolymer of those resins can be also used.

Pore diameter of the porous support layer is preferably in the range of 0.01 to 1 μm. As the pore diameter is the same or lower than the upper limit of the above range, inside of fine pores of the homogeneous layer (that is, hole through with gas passes) is not likely to get wet, and accordingly, deterioration of the homogeneous layer which is caused by a chemical contained in a liquid in a membrane treatment subject is reduced. Furthermore, as the pore diameter is the same or higher than the lower limit of the above range, high gas permeability is obtained so that the deaeration performance becomes excellent. Furthermore, the porosity of the porous support layer is preferably 30 to 80% by volume. As the porosity is the same or higher than the lower limit of the above range, the gas permeability is improved so that the deaeration performance becomes excellent. Furthermore, as the porosity is the same or lower than upper limit of the above range, mechanical strength of the hollow fiber membrane such as pressure resistance can be improved.

Membrane thickness of the homogeneous layer is preferably 1 to 10 μm. When the membrane thickness is less than 1 μm, it is easy to have insufficient pressure resistance at the time of use. On the other hand, when the membrane thickness is more than 10 μm, it is easy to have insufficient gas permeability although it may vary depending on a material to be used. Furthermore, one layer thickness of the porous support layer is preferably 10 to 50 μm, and the porosity of the porous support layer is preferably 10 to 50% by volume.

Combination of the material for the homogeneous layer and porous support layer is not particularly limited. Resins with different kinds may be combined and used, or resins with the same kind may be combined and used.

The gas permeable composite membrane with three-layer constitution can be produced by a known method which has a step of multilayer complex spinning using a concentric complex nozzle and a step of elongation and pore formation.

(Module Case)

It is preferable that the material of the module case 12 has suitable mechanical strength and also chemical resistance against a component to be included in a liquid of a membrane treatment subject like ink for an inkjet printer, for example. Specific examples of the material include hard polyvinyl chloride resin; polycarbonate; polysulfone-based resin; polyolefin-based resin like polypropylene; acryl-based resin; ABS resin; and modified polyphenylene oxide. Shape of the module case is not limited to a cylinder shape.

(Method for Producing Hollow Fiber Membrane Module)

The hollow fiber membrane module 10 of the example illustrated in drawings can be produced by the following method, for example.

First, from the opening part at one side of the module case 12, the membrane bundle restraining device 30 is inserted with bending. The protrusion part 32 is inserted to the groove part 14 and the membrane bundle restraining device 30 is fixed in the module case 12. Subsequently, arbitrary number of the hollow fiber membranes 22 are bound together to give the hollow fiber membrane bundle 20, which is then encased in a convergence bag consisting of a polyamide-based resin, a polyester-based rein, a polyolefin-based resin, or the like. Subsequently, inside of the convergence bag is depressurized, and, in a state in which the hollow fiber membranes 22 of the hollow fiber membrane bundle 20 are densely associated, the convergence bag is sealed (that is, sealing under reduced pressure). Then, the sealed convergence bag is inserted to the module case 12 that is fixed with the membrane bundle restraining device 30, and according to insertion to the opening part 36 of the membrane bundle restraining device 30, the convergence bag is encased.

After that, the convergence bag is open, and by removing only the convergence bag from the module case 12, the hollow fiber membrane bundle 20 is disposed inside the module case 12. Consequently, each hollow fiber membrane 22 is restrained by the membrane bundle restraining device 30 so that it is prevented from being loosened, distorted, or bent. Furthermore, by inserting the hollow fiber membrane bundle 20 to the opening part 36 using a convergence bag as described above, not only the insertion can be easily carried out but also a damage of the hollow fiber membrane 22, which is caused by contact between the hollow fiber membrane bundle 20 and the opening part 36 during insertion, can be prevented.

Subsequently, with an aid of a concentric potting material injection device, the potting material is injected to the end part of the module case 12. As the potting material flows through the penetrating hole 34 and the interval 38 at that time, the potting material is evenly distributed on both surface of the membrane bundle restraining device 30. After that, according to curing of the potting material, the potting part 16 is formed.

Subsequently, by cutting the potting part 16 in a direction which is vertical to the length direction of the hollow fiber membrane bundle 20, a flat surface is formed, and the end part 24 of each hollow fiber membrane bundle 20 is open. At that time, from the viewpoint of the processability, the cutting is preferably performed after heating to 60 to 85° C. After that, if necessary, for exhibiting the final physical properties, the potting part 16 is heated to 60 to 90° C. and curing is performed.

According to the above, it is possible to obtain the hollow fiber membrane module 10.

(Deaeration Method Using Hollow Fiber Membrane Module)

When deaeration of liquid is performed by using the hollow fiber membrane module 10, liquid to be treated of a membrane treatment subject is introduced from the end part 24 of the hollow fiber membrane bundle 20 to the inside of a hollow part of each hollow fiber membrane 22 by using a liquid transport means like liquid transport pump. Specifically, on one end part in the length direction of the module case 12, for example, a cap having a liquid inlet formed thereon (not illustrated) is provided, and liquid to be treated is introduced through the liquid inlet. Meanwhile, on an air outlet (not illustrated) formed on a side surface of the module case 12, a depressurizing device like vacuum pump is connected, and by operating the depressurizing device, the external side of the hollow fiber membrane bundle 20 in the module case 12 is maintained in a depressurize state. Accordingly, the liquid to be treated which flows through each hollow fiber membrane 22 is deaerated. The deaerated treatment liquid is obtained from a liquid outlet of a cap, which is formed on the other end part of the module case 12 (not illustrated). From the air outlet, gas removed from the treatment liquid such as oxygen is discharged.

When the liquid to be treated of a deaeration subject is ink for an inkjet printer, for example, the hollow fiber membrane module 10 can be connected to an ink supply line of a printer such that the ink is transported from an ink tank to the liquid inlet of the hollow fiber membrane module 10 and the ink after completion of deaeration that is obtained from the liquid outlet is supplied to a recording head of the inkjet printer.

Furthermore, regarding the aforementioned deaeration method, the descriptions are given for an internal once-through mode in which the liquid to be treated of a membrane treatment subject is introduced to the inside of the hollow fiber membrane and deaerated. However, it may also adopt an external once-through mode in which the liquid to be treated is supplied to an external side of the hollow fiber membrane.

EXAMPLES

Hereinbelow, the invention is described in detail in view of the examples.

Example 1

(Potting Material)

A potting material consisting of an epoxy resin composition was prepared as described below.

p-Aminophenol type epoxy resin ("jER630" manufactured by Mitsubishi Chemical Corporation) as the epoxy resin component (a), a polysulfide-modified epoxy resin ("FLEP 60" manufactured by Toray Fine Chemicals Co., Ltd.) as the epoxy resin component (b), a bisphenol A type epoxy resin ("jER828" manufactured by Mitsubishi Chemical Corporation) as the epoxy resin component (c), and "ANCAMINE LV" and "ANCAMINE LVS" that are manufactured by Air Products and Chemicals Japan, INC. (both containing epoxy-modified 4,4'-diaminodiphenylmethane as a main component) as the aromatic polyamine curing agent (d) were mixed with one another according to the blending shown in Table 1 followed by defoaming to prepare an epoxy resin composition.

Subsequently, the epoxy resin composition was injected to a space between a pair of glass plates in which a spacer with thickness of 2 mm is disposed in a liquid-tight manner. Accordingly, a non-cured resin plate consisting of the epoxy resin composition was produced. Subsequently, the non-cured resin plate was allowed to stand overnight at room temperature followed by heating and curing for 6 hours at 60° C.

The cured resin plate was cut to a size of 50 mm×10 mm×2 mm, and the resultant is used as a test piece.

By using the test piece, the immersion test by which the test piece is immersed in each of the first chemical liquid and the second chemical liquid (40° C.×1 week) was carried out, and the mass change ratio (%) and hardness change ratio (%) before and after the immersion were obtained. Furthermore, the thickness change ratio (%) determined by the following formula was also obtained as described above. As for the thickness change ratio (%), the average value obtained by measurement of 3 samples for each chemical liquid was used.

Thickness change ratio (%)=$(Da-Db) \times 100/Db$

Da: Thickness of cured product after immersion in chemical liquid

Db: Thickness of cured product before immersion in chemical liquid

The results are shown in Table 1.

Example 2

(Potting Material)

The epoxy resin composition was prepared in the same manner as Example 1 except that the blending of each component is modified as shown in Table 1. Further, after preparing a test piece, the immersion test was carried out. The results are shown in Table 1.

Furthermore, by obtaining a test piece (50 mm×10 mm×2 mm) in the same method as described in [Example 1], measurement of dynamic viscoelasticity was carried out and storage modulus was calculated.

Specifically, by using the test piece, the measurement was carried out with frequency of 1 Hz at 80° C. heating condition, and the value obtained 10 minutes after the start of heating was used as storage modulus. Measurement conditions include test length of 35 mm and deformation of 0.05% with distortion mode.

The results are shown in Table 3.

Example 3

(Potting Material)

The epoxy resin composition was prepared in the same manner as Example 1 except that the blending of each component is modified as shown in Table 1. Further, after preparing a test piece, the immersion test was carried out. The results are shown in Table 1.

Furthermore, measurement of dynamic viscoelasticity (that is, measurement of storage modulus) was carried out in the same manner as Example 2. The results are shown in Table 3.

(Hollow Fiber Membrane Module, Deaeration Test)

A hollow fiber membrane bundle was prepared to have effective membrane area of 640 cm$^2$ in which plural hollow fiber membranes (that is, gas permeable composite membrane consisting of "MHF200SD" manufactured by Mitsubishi Rayon Co., Ltd., a gas permeable homogeneous layer, and a porous support layer for inserting the homogeneous layer) are bound. The resultant was encased in a polypropylene module case which has a gas outlet formed on the side surface of the case. After that, by using the epoxy resin composition of Example 2 as a potting material, the hollow fiber membrane bundle was fixed in the module case while both ends of the hollow fiber membrane bundle are remained open. Accordingly, a hollow fiber membrane module was produced. Meanwhile, on one end of the module case, a cap with a liquid inlet formed thereon was applied, and on the other end of the module case, a cap with a liquid outlet formed thereon was applied.

Three pieces of the above hollow fiber membrane module were produced. For the 2 modules among them, the second chemical liquid was filled inside (hollow part) of each hollow fiber membrane, and after sealing the liquid inlet, liquid outlet, and air outlet, the modules were stored at 40° C. One of the two modules was stored for 1 week and the other was stored for 2 weeks. After the storage, according to opening of the liquid inlet, liquid outlet, and air outlet of the two hollow fiber membrane modules, the second chemical liquid was extracted from each of the two hollow fiber membrane modules.

Consequently, for each of the two hollow fiber membrane modules, water to be treated was allowed to pass through from the liquid inlet. Accordingly, deaerated treatment water was obtained from the liquid outlet. In addition, concentration of dissolved oxygen which is remained in the treatment water was measured. The results of this deaeration test are shown in Table 2.

As for the water to be treated for water pass-through, water with dissolved oxygen concentration of 8.1 mg/L and water temperature of 25° C. was used, and the water was allowed to pass through at flow rate condition of 40 mL/min. To the air outlet, a vacuum pump was connected and suction was carried out to have vacuum degree of −90 kPa. Concentration of dissolved oxygen was measured by using a diaphragm type dissolved oxygen meter.

Meanwhile, in the column of "initial state" in Table 2, the dissolved oxygen concentration in treatment water at the time of performing the deaeration test that has been carried out before filling of the second chemical liquid is indicated.

(Hollow Fiber Membrane Module; Metal Dissolution Test)

By using the remaining one hollow fiber membrane module among the three modules which have been produced in the above, a metal dissolution test was carried out.

First, inside (hollow part) of each hollow fiber membrane of the above hollow fiber membrane module, 1% by mass of hydrochloric acid solution was filled and stored for 5 days at 60° C. after sealing the liquid inlet, liquid outlet, and air outlet. After that, according to opening of the liquid inlet, liquid outlet, and air outlet, the 1% by mass of hydrochloric acid solution was extracted from the hollow fiber membrane. Extracted solution was analyzed by ICP spectrophotometric analysis. Then, content of the metals contained in the solution (that is, Na, Mg, Al, Ca, and Fe) was measured.

As a result, it was found that Na is less than 5 μg/L, Al is at 50 μg/L, Ca is at 230 μg/L, and Mg and Fe are not detected and the dissolution amount of the metals is at the practically acceptable level.

Comparative Example 1

The epoxy resin composition was prepared in the same manner as Example 1 except that the blending of each component is modified as shown in Table 1. Further, after preparing a test piece, the immersion test was carried out. The results are shown in Table 1.

Furthermore, measurement of dynamic viscoelasticity (that is, measurement of storage modulus) was carried out in the same manner as Example 2. The results are shown in Table 3.

Furthermore, two pieces of the hollow fiber membrane module were produced in the same manner as Example 2 except that the epoxy resin composition obtained from Comparative Example 1 is used as a potting material, and then the same deaeration test as Example 2 was carried out. The results are shown in Table 2.

Comparative Example 2

A test piece of which blending of each component is modified as shown in Table was prepared and the immersion test was carried out in the same manner as Example 1. The results are shown in Table 1. Meanwhile, because 4,4′-diaminodiphenylmethane (not modified) which has been used as a curing agent at that time was a solid at room temperature, the preparation of the epoxy resin composition was carried out after dissolving it at 120° C., which is higher than the melting point of 90° C. of the compound. As the solidification occurs within a short time due to the temperature decrease during the preparatory operations, it was difficult to produce a test piece by using a glass plate. As such, by following the prepared liquid on a horizontal plane, a test piece was obtained. As thickness homogeneity and surface smoothness are poor, the thickness measurement at the time of test was not carried out.

TABLE 1

|  |  |  |  | Example 1 | Example 2 | Example 3 | Comparative Example 1 | Comparative Example 2 |
|---|---|---|---|---|---|---|---|---|
| Blending (% by mass) | Epoxy resin component (a) | jER630 |  | 17.6 (30.0) | 27.2 (50.0) | 5.1 (10.0) | 0 | 14.0 (20.0) |
|  |  | jER604 |  | 0 | 0 | 45.9 (90.0) | 0 | 55.9 (80.0) |
|  | Epoxy resin component (b) | FLEP 60 |  | 15.4 (26.2) | 10.2 (18.75) | 0 | 24.75 (37.5) | 0 |
|  | Epoxy resin component (c) | jER828 |  | 25.7 (43.8) | 17.0 (31.25) | 0 | 41.25 (62.5) | 0 |

TABLE 1-continued

|  |  |  | Example 1 | Example 2 | Example 3 | Comparative Example 1 | Comparative Example 2 |
|---|---|---|---|---|---|---|---|
|  | Aromatic polyamine curing agent (d) | ANCAMINE LV | 36.4 | 40.2 | 43.2 | 30 | 0 |
|  |  | ANCAMINE LVS | 4.9 | 5.4 | 5.8 | 4 | 0 |
|  |  | 4,4'-Diaminodiphenylmethane | 0 | 0 | 0 | 0 | 30.1 |
|  | Total (% by mass) |  | 100 | 100 | 100 | 100 | 100 |
| Physical properties | Immersion test using the first chemical liquid | Mass change ratio (%) | +5.8 | +2.5 | +0.6 | +14.1 | +8.0 |
|  |  | Thickness change ratio (%) | +6.2 | +3.2 | +0.5 | +6.2 | — |
|  |  | Hardness change ratio (%) | −9.3 | −6.9 | −0.7 | −39.9 | −1.3 |
|  | Immersion test using the second chemical liquid | Mass change ratio (%) | −0.1 | +0.2 | +0.02 | +5.9 | +10.8 |
|  |  | Thickness change ratio (%) | +0.2 | +0.2 | −0.3 | +5.1 | — |
|  |  | Hardness change ratio (%) | +0.1 | 0 | −0.7 | −8.1 | −9.4 |

Numerical values within ( ) indicate the content (% by mass) when the total of the epoxy resin components (a) to (c) is 100% by mass.

Meanwhile, in the present example, confirmation of the presence or absence of deterioration of the aromatic polyamine curing agent (d) was based on the SDS information of each curing agent (Safety Data Sheet based on PRTR law in Japan) and chemical structure analysis using gas chromatography and infrared spectroscopy.

TABLE 2

| | Concentration of dissolved oxygen in treatment water (mg/L) | | | |
|---|---|---|---|---|
| | Example 2 | | Comparative Example 1 | |
| | Initial state | After filling of the second chemical liquid | Initial state | After filling of the second chemical liquid |
| Storage for 1 week | 1.9 | 1.8 | 1.8 | Impossible to measure due to occurrence of a leak |
| Storage for 2 weeks | 2.0 | 2.1 | 2.1 | Impossible to measure due to occurrence of a leak |

TABLE 3

| | Storage modulus (Pa) | | |
|---|---|---|---|
| | Example 2 | Example 3 | Comparative Example 1 |
| After 10 minutes at 80° C. | $1.27 \times 10^7$ | $1.26 \times 10^8$ | $6.58 \times 10^6$ |

As shown in Table 1, the cured product of the potting material of each Example exhibited excellent chemical resistance. On the other hand, the cured product of the potting material of Comparative Example 1 and Comparative Example 2 exhibited poor chemical resistance.

As shown in Table 2, the hollow fiber membrane module which has been produced by using the potting material of Example 2 was not observed with any change in deaeration performance even after it is filled with the second chemical liquid and then stored for 2 weeks. On the other hand, the hollow fiber membrane module which has been produced by using the potting material of Comparative Example 1 was observed with an occurrence of a leak as a result of filling with the second chemical liquid followed by storage for 1 week.

As shown in Table 3, the cured product of the potting material of Example 2 has storage modulus in the range of $1.0 \times 10^6$ to $5.0 \times 10^7$ Pa at 80° C., and has suitable hardness.

For such reasons, it was demonstrated that it is difficult to have a loss on a cut surface when the cured product has been cut after heating (within 1 minute from the completion of heating). Meanwhile, the cured product of the potting material of Example 3 has high storage modulus at 80° C. and was found to be harder than the curing product of Example 2. For such reasons, it was demonstrated that there is a possibility of have a problem in the processability like a loss on a cut surface if the cured product is cut after heating (within 1 minute from the completion of heating).

EXPLANATIONS OF LETTERS OR NUMERALS

10 Hollow fiber membrane module
12 Module case
16 Potting part
20 Hollow fiber membrane bundle
22 Hollow fiber membrane
30 Membrane bundle restraining device

The invention claimed is:

1. A potting material for membrane modules which is formed of an epoxy resin composition, in which a mass change ratio of a cured product of the epoxy resin composition after being immersed in diethylene glycol methyl ethyl ether at 40° C. for one week is ±10% or less, and a mass change ratio of a cured product of the epoxy resin composition after being immersed in tetrahydrofurfuryl acrylate at 40° C. for one week is ±5% or less.

2. The potting material for membrane modules according to claim 1, wherein a storage modulus of the cured product of the potting material for the membrane modules is $1.0 \times 10^6$ to $5.0 \times 10^7$ Pa at 80° C.

3. The potting material for membrane modules according to claim 1, wherein the epoxy resin composition contains at least an epoxy resin component (a) which has 1 or more aromatic rings and 3 or more glycidyl groups.

4. The potting material for membrane modules according to claim 3, wherein the epoxy resin composition contains the epoxy resin component (a), an epoxy resin component (b) having a polysulfide skeleton, and a glycidyl ether type epoxy resin component (c).

5. The potting material for membrane modules according to claim 3, wherein the epoxy resin composition additionally contains an aromatic polyamine curing agent (d).

6. The potting material for membrane modules according to claim 5, wherein the aromatic polyamine curing agent (d) is epoxy-modified aromatic polyamine.

7. The potting material for membrane modules according to claim 5, wherein the aromatic polyamine curing agent (d) is a compound derived from 4,4'-diaminodiphenylmethane.

8. A hollow fiber membrane module comprising
a hollow fiber membrane bundle which comprises a plurality of hollow fiber membranes, and a module case in which the hollow fiber membrane bundle is encased,
wherein an end part of the hollow fiber membrane bundle is fixed in the module case by the potting material for membrane modules according to claim 1.

9. The hollow fiber membrane module according to claim 8, wherein the hollow fiber membranes are gas permeable composite membranes formed of a gas permeable homogeneous layer and a porous support layer to which the homogeneous layer is inserted.

10. The hollow fiber membrane module according to claim 8, wherein a membrane bundle restraining device for restraining the hollow fiber membrane bundle at a region fixed by the potting material for membrane modules is disposed in the module case.

* * * * *